US011852492B1

(12) United States Patent
Urmson et al.

(10) Patent No.: US 11,852,492 B1
(45) Date of Patent: Dec. 26, 2023

(54) METHOD AND APPARATUS TO TRANSITION BETWEEN LEVELS USING WARP ZONES

(71) Applicant: Waymo LLC, Mountain View, CA (US)

(72) Inventors: Christopher Paul Urmson, Mountain View, CA (US); Michael Steven Montemerlo, Mountain View, CA (US); Andrew Hughes Chatham, San Francisco, CA (US); Daniel Trawick Egnor, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 562 days.

(21) Appl. No.: 17/075,867

(22) Filed: Oct. 21, 2020

Related U.S. Application Data

(60) Continuation of application No. 15/878,563, filed on Jan. 24, 2018, now Pat. No. 10,845,202, which is a
(Continued)

(51) Int. Cl.
*B60W 30/12* (2020.01)
*G01C 21/34* (2006.01)
(Continued)

(52) U.S. Cl.
CPC .......... *G01C 21/3407* (2013.01); *B60W 30/12* (2013.01); *B60W 30/18154* (2013.01); *G01C 21/28* (2013.01); *G01C 21/34* (2013.01); *G05D 1/0088* (2013.01); *G05D 1/0246* (2013.01); *G05D 1/0255* (2013.01); *G05D 1/0257* (2013.01); *G05D 1/0274* (2013.01);
(Continued)

(58) Field of Classification Search
CPC .......... A61K 2039/54; A61K 2039/545; A61K 2039/55; A61K 2039/505; A61K 9/0019; A61P 7/00; C07K 16/18; C07K 16/283; C07K 16/40; C07K 2317/24; C07K 2317/52; C07K 2317/565; C07K 2317/76; C07K 2317/92
See application file for complete search history.

(56) References Cited

U.S. PATENT DOCUMENTS 7,672,778 B1   3/2010   Elliott
8,489,316 B1   7/2013   Hedges et al.
(Continued)

OTHER PUBLICATIONS

Kummerle et al., Autonomous Driving in a Multi-level Parking Structure, 2009 IEEE International Conference on Robotics and Automation, Kobe, 2009, pp. 3395-3400 (Year: 2009).*
(Continued)

*Primary Examiner* — Charles J Han
(74) *Attorney, Agent, or Firm* — Botos Churchill IP Law

(57) ABSTRACT

An autonomous vehicle may access portions of a map to maneuver a roadway. The map may be split into one or more levels that represent different regions in space. For example, an overpass may be represented by one level while the road below the overpass may be on a separate level. A vehicle traveling on a particular level may use map data that is associated with that level. Furthermore, if the vehicle travels through a warp zone, it may transition from the current level to a destination level and thus begin to use map data associated with the destination level.

23 Claims, 14 Drawing Sheets

Related U.S. Application Data continuation of application No. 15/188,138, filed on Jun. 21, 2016, now Pat. No. 9,909,887, which is a continuation of application No. 14/590,278, filed on Jan. 6, 2015, now Pat. No. 9,400,183, which is a division of application No. 13/293,472, filed on Nov. 10, 2011, now abandoned.

(51) Int. Cl.
     *B60W 30/18*      (2012.01)
     *G01C 21/28*      (2006.01)
     *G05D 1/00*      (2006.01)
     *G05D 1/02*      (2020.01)

(52) U.S. Cl.
     CPC ....... *G05D 1/0278* (2013.01); *B60W 2552/05* (2020.02); *B60W 2556/50* (2020.02)

(56) References Cited

U.S. PATENT DOCUMENTS

| | | | |
|---|---|---|---|
| 8,825,391 | B1 | 9/2014 | Urmson et al. |
| 9,400,183 | B1 | 7/2016 | Urmson et al. |
| 9,582,907 | B1 | 2/2017 | Szybalski et al. |
| 2001/0025251 | A1* | 9/2001 | Konishi ............... G07B 15/063 705/13 |
| 2008/0201072 | A1 | 8/2008 | Adachi |
| 2009/0043489 | A1 | 2/2009 | Weidner |
| 2009/0201263 | A1 | 8/2009 | Hofmann |
| 2010/0204916 | A1 | 8/2010 | Garin |
| 2010/0332127 | A1* | 12/2010 | Imai ...................... B60W 30/12 701/532 |
| 2012/0265437 | A1 | 10/2012 | Schaminee |
| 2013/0322702 | A1 | 12/2013 | Piemonte et al. |
| 2014/0267282 | A1 | 9/2014 | Ren et al. |
| 2017/0254661 | A1 | 9/2017 | Moore et al. |

OTHER PUBLICATIONS

Chen, et al., "Automatic Reconstruction of 3D Road Models By Using 2D Road Maps and Airborne Lidar Data", Center for Space and Remote Sensing Research, 2005, 6 pages.

Elberink, et al., "Adding the third Dimension to a Topographic Database using Airborne Laser Scanner Data" Department of Earth Observation Science, International Institute for Geo-Information Science and Earth Observation, 2005, 6 pages.

Kummerle, et al., "Autonomous Driving in a Multi-Level Parking Structure,", IEEE International Conference on Robotics and Automation, Kobe, May 12-17, 2009, pp. 3395-3400.

Triebel, et al., "Multi-Level Surface Maps for Outdoor Terrain Mapping and Loop Closing", University of Freiburg, 2005, 7 pages.

* cited by examiner

METHOD AND APPARATUS TO TRANSITION BETWEEN LEVELS USING WARP ZONES

CROSS-REFERENCE TO RELATED APPLICATIONS

The present application is a continuation of U.S. patent application Ser. No. 15/878,563, filed Jan. 24, 2018, which is a continuation of U.S. patent application Ser. No. 15/188,138, filed on Jun. 21, 2016, now U.S. Pat. No. 9,909,887, which is a continuation of U.S. patent application Ser. No. 14/590,278, filed Jan. 6, 2015, now U.S. Pat. No. 9,400,183, which is a divisional of U.S. patent application Ser. No. 13/293,472, filed Nov. 10, 2011, the disclosures of which are incorporated herein by reference.

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

A vehicle may be equipped with various types of sensors and receivers in order to detect the location of itself and objects in its surroundings. For example, an autonomous vehicle may include lasers, sonar, radar, cameras, global positioning units, and other devices which pinpoint the location of the vehicle. These devices alone or in combination may be used to both build 3D models of the objects detected in the vehicle's surrounding and orient the vehicle with its surrounding. A vehicle traveling in a 3D environment, however, may rely on a 2D map. As such, it may be difficult for the vehicle to know exactly where it is located if the vehicle is, for example, traveling underneath an overpass.

SUMMARY

In one embodiment, a method for controlling a vehicle may comprise determining the current location of the vehicle and accessing, using a processor, roadgraph data based on the current location of the vehicle, the roadgraph data including information about a roadway including one or more levels associated with the current location. The method may further comprise determining, using the processor, a current level of the vehicle, wherein the current level is a source level for one or more warp zones, maneuvering the vehicle using the roadgraph data associated with the current level, identifying, using a geographic position component, that the vehicle is within a given one of the one or more warp zones associated with the current level, accessing the roadgraph data associated with a destination level of the given warp zone, and using the roadgraph data associated with the destination level to maneuver the vehicle.

In another embodiment, an apparatus may comprise a processor in communication with a memory and configured to execute instructions stored in the memory to determine a current location of the vehicle. The memory may further store instructions and roadgraph data associated with the current location of the vehicle, the roadgraph data including information about a roadway including one or more levels associated with the current location. The processor may further be configured to execute the instructions stored in the memory to determine a current level of the vehicle, wherein the current level is a source level for one or more warp zones, maneuver the vehicle using the roadgraph data associated with the current level, identify, using data received from a geographic position component, that the vehicle is within a given one of the one or more warp zones associated with the current level, access the roadgraph data associated with a destination level of the given warp zone, and use the roadgraph data associated with the destination level to maneuver the vehicle.

In another embodiment, a method for creating a map may include accessing, with a processor, trajectory data, the trajectory data including information about a roadway, partitioning, with the processor, the trajectory data into a plurality of segments, identifying, with the processor, a plurality of intersecting segments, and associating each of the intersecting segments with a level so that the map is partitioned into a plurality of levels.

DETAILED DESCRIPTION

Figure 1:
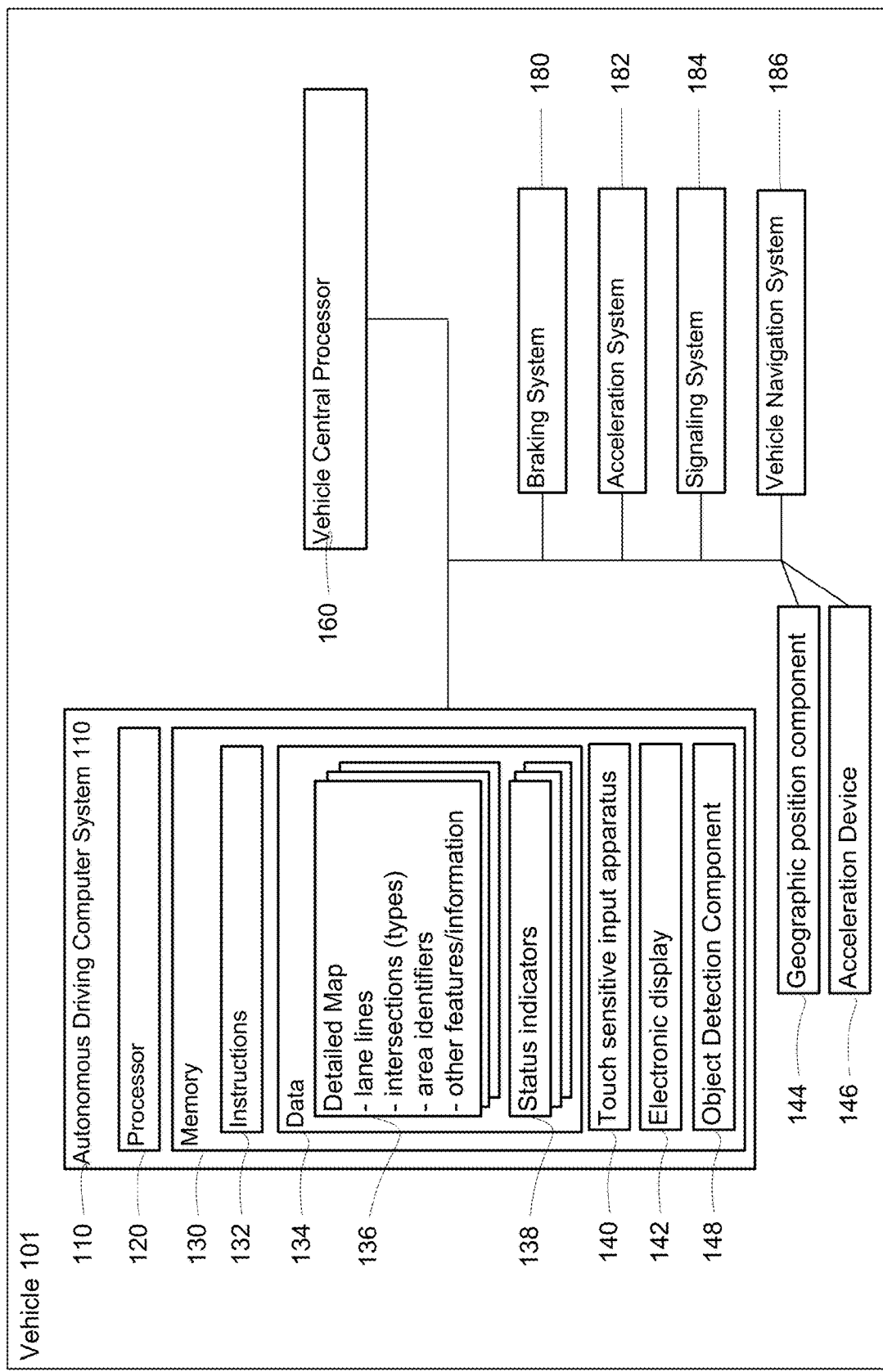
FIG. 1 is a functional diagram of a system in accordance with an exemplary embodiment.

As shown in FIG. 1, an autonomous driving system 100 in accordance with one exemplary embodiment includes a vehicle 101 with various components. While certain aspects of embodiments described herein are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, trams, golf carts, trains, farm equipment, construction equipment, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although aspects of the claimed subject matter are not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC or other hardware-based processing device. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, the memory may be a hard drive or other storage media located in a housing different from that of computer 110. Accordingly, references to a processor or computer or memory will be understood to include references to a collection of processors, computers, or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a one or more maneuvers.

Computer 110 may all of the components normally used in connection with a computer, including a display 142 (e.g., a monitor having a screen, a small LCD touch-screen or any other electrical device that is operable to display information), user input (e.g., a mouse, keyboard, touch screen and/or microphone), as well as various sensors (e.g., a video camera) for gathering explicit (e.g., a gesture) or implicit (e.g., "the person is asleep") information associated with a driver or other person or the vehicle 101. In one example, computer 110 may be an autonomous driving computing system incorporated into vehicle 101.

Figure 2:
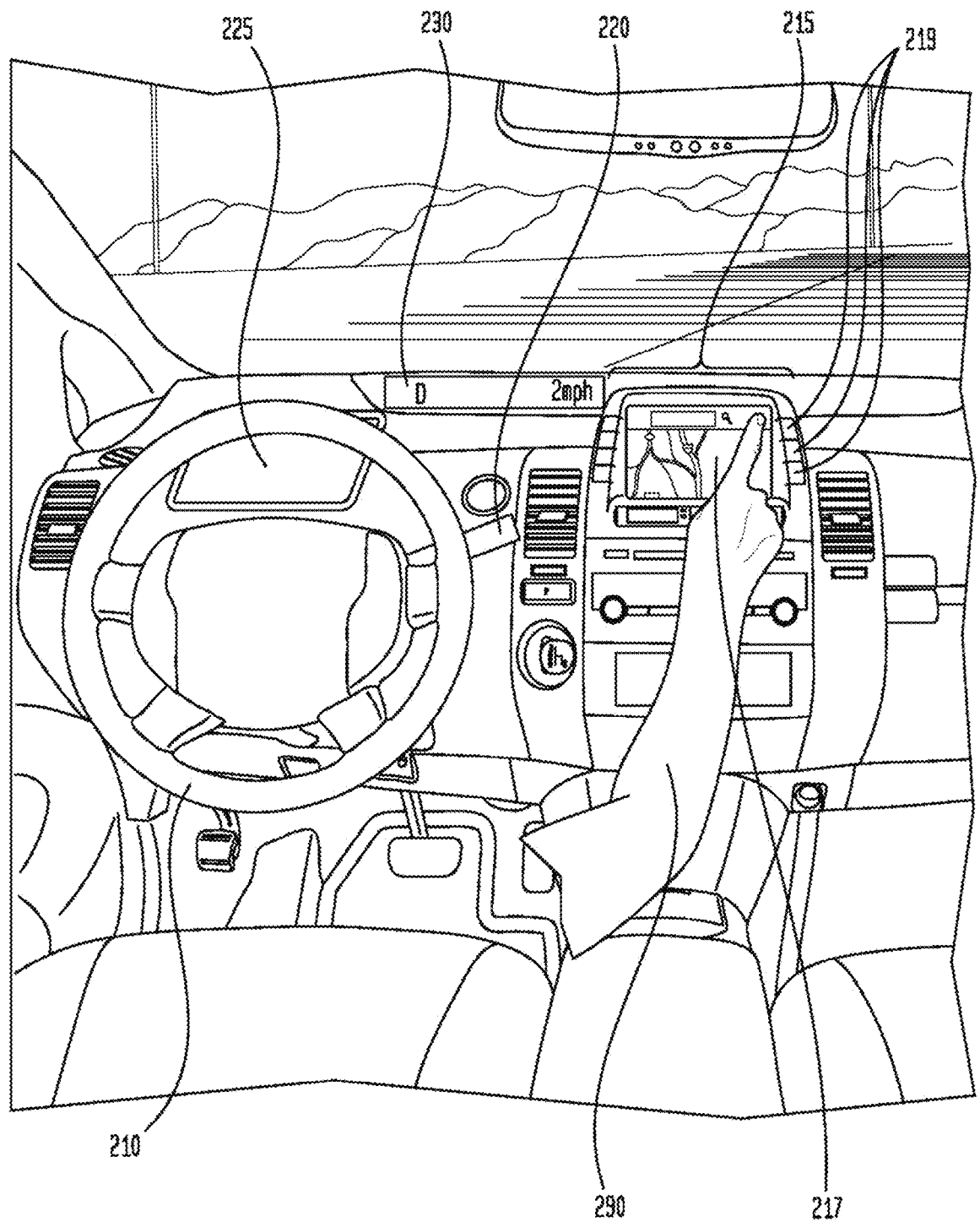
FIG. 2 is a design of the interior of an autonomous vehicle in accordance with an exemplary embodiment.

FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215; and a gear selector apparatus, such as gear shifter 220. The vehicle may also have various user input devices, such as touch screen 217 and/or button inputs 219, for activating or deactivating one or more autonomous driving modes and for enabling a driver or passenger 290 to provide information, such as a navigation destination, to the autonomous driving computer 110.

Vehicle 101 may also include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, such as steering wheel 210, or provide various other types of indications.

The autonomous driving computing system may be capable of communicating with various components of the vehicle. For example, as shown in FIG. 1, computer 110 may be in communication with the vehicle's central processor 160 and may send and receive information from the various systems of vehicle 101, for example braking 180, acceleration 182, signaling 184, and navigation 186 systems in order to control the movement, speed, etc., of vehicle 101. In addition, when engaged, computer 110 may control some or all of these functions of vehicle 101 and thus be fully or partially autonomous. It will be understood that although various systems and computer 110 are shown within vehicle 101, these elements may be external to vehicle 101 or physically separated.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The vehicle may also include other devices in communication with computer 110, such as an accelerometer, gyroscope or another direction/speed detection component as shown by accelerator device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, the computer 110, other computers and combinations of the foregoing.

The computer 110 may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system may include lasers, sonar, radar, cameras or any other detection devices which record data which may be processed by computer 110. For example, if the vehicle is a small passenger car, the car may include a laser mounted on the roof or other convenient location. In one aspect, the laser may measure the distance between the vehicle and the object surfaces facing the vehicle by spinning on its axis and changing its pitch.

The vehicle may also include various radar detection units, such as those used for adaptive cruise control systems. The radar detection units may be located on the front and back of the car as well as on either side of the front bumper. In another example, a variety of cameras may be mounted on the car at distances from one another which are known so that the parallax from the different images may be used to compute the distance to various objects which are captured by 2 or more cameras. These sensors may allow the vehicle to evaluate and potentially respond to its environment in order to maximize safety for passengers as well as objects or people in the environment.

In addition to the sensors described above, the computer may also use input from sensors typical in non-autonomous vehicles. For example, these sensors may include tire pressure sensors, engine temperature sensors, brake heat sensors, break pad status sensors, tire tread sensors, fuel sensors, oil level and quality sensors, air quality sensors (for detecting temperature, humidity, or particulates in the air), etc.

Many of these sensors may provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, data 134 may include detailed map information 136, e.g., highly detailed maps identifying the shape and elevation of roadways, lane lines, intersections, crosswalks, speed limits, traffic signals, buildings, signs, real time traffic information, or other such objects and information. The map information may include explicit speed limit information associated with various roadway segments. The speed limit data may be entered manually or scanned from previously taken images of a speed limit sign using, for example, optical character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

Again, although the map information is depicted herein as an image-based map, it will be understood that this information may include one or more roadgraphs or a graph network of information such as roads, lanes, intersections, and the connections between these features. In this regard, the roadgraph need not be image based (for example, raster). Each feature may be stored in a cell or grid of the roadgraph and associated with various information such as a geographic location and whether or not it is linked to other related features. For example, a stop sign may be linked to a road and an intersection, etc.

Figure 3:
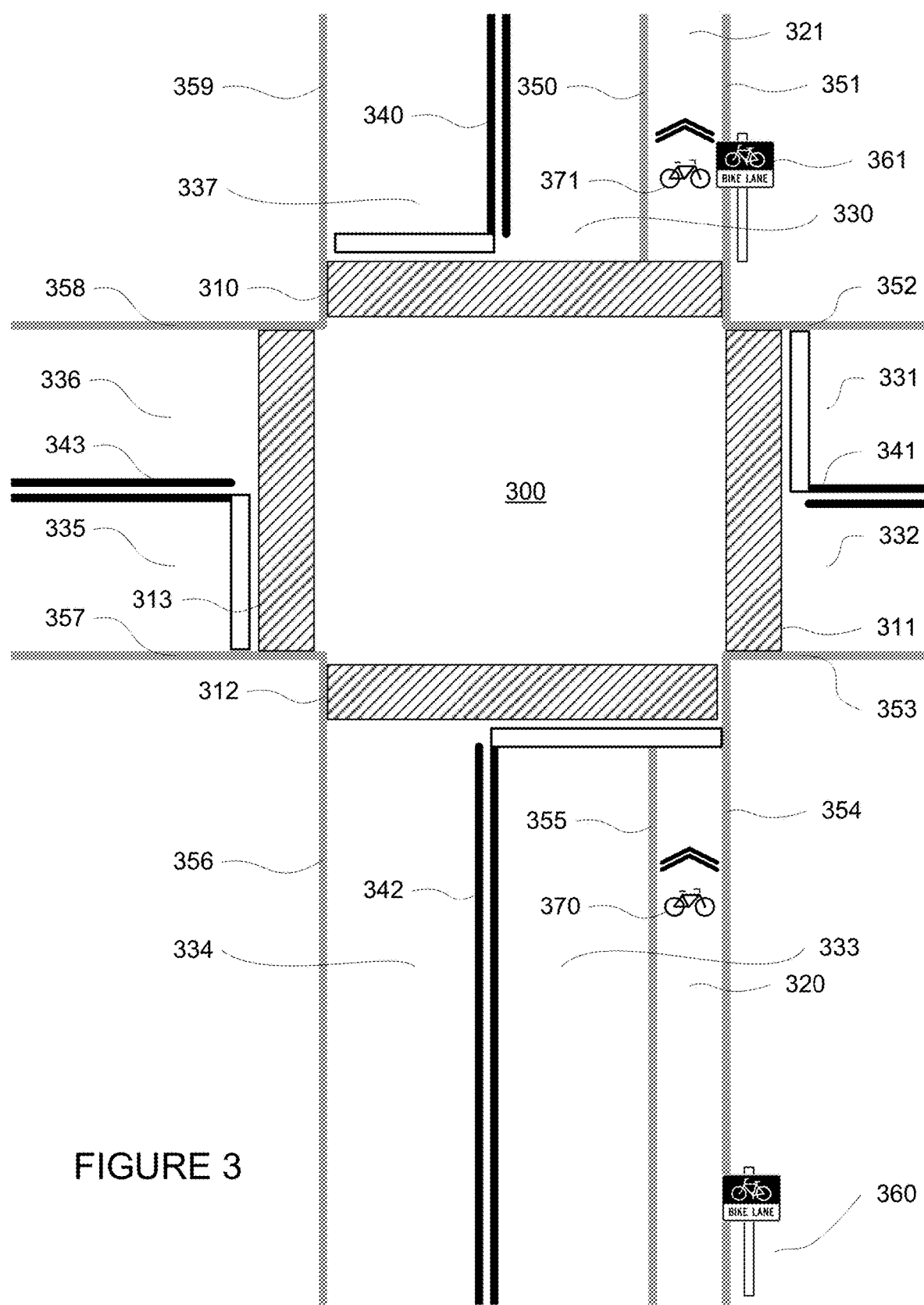
FIG. 3 is a birds-eye view of an intersection in accordance with an exemplary embodiment.

FIG. 3 depicts a birds-eye view of an exemplary intersection 300 which may be the subject of detailed map 136. The intersection may include a number of different features such as crosswalks 310-313, bicycle lanes 320-321, driving lanes 330-337, and lane lines 340-343 and 350-359. Intersection 300 may also include indicators such as signs 350-351 and 360-361 identifying specific areas such as the bicycle lanes 320-321. Other features such as traffic signals or stop signs may also be present, but are not shown in this figure.

Although intersection 300 includes four roadways meeting perpendicular to one another, various other intersection configurations may also be employed. It will be further understood that aspects described herein are not limited to intersections, but may be utilized in conjunction with various other traffic or roadway designs which may or may not include additional features or all of the features described with respect to intersection 300.

Figure 4:
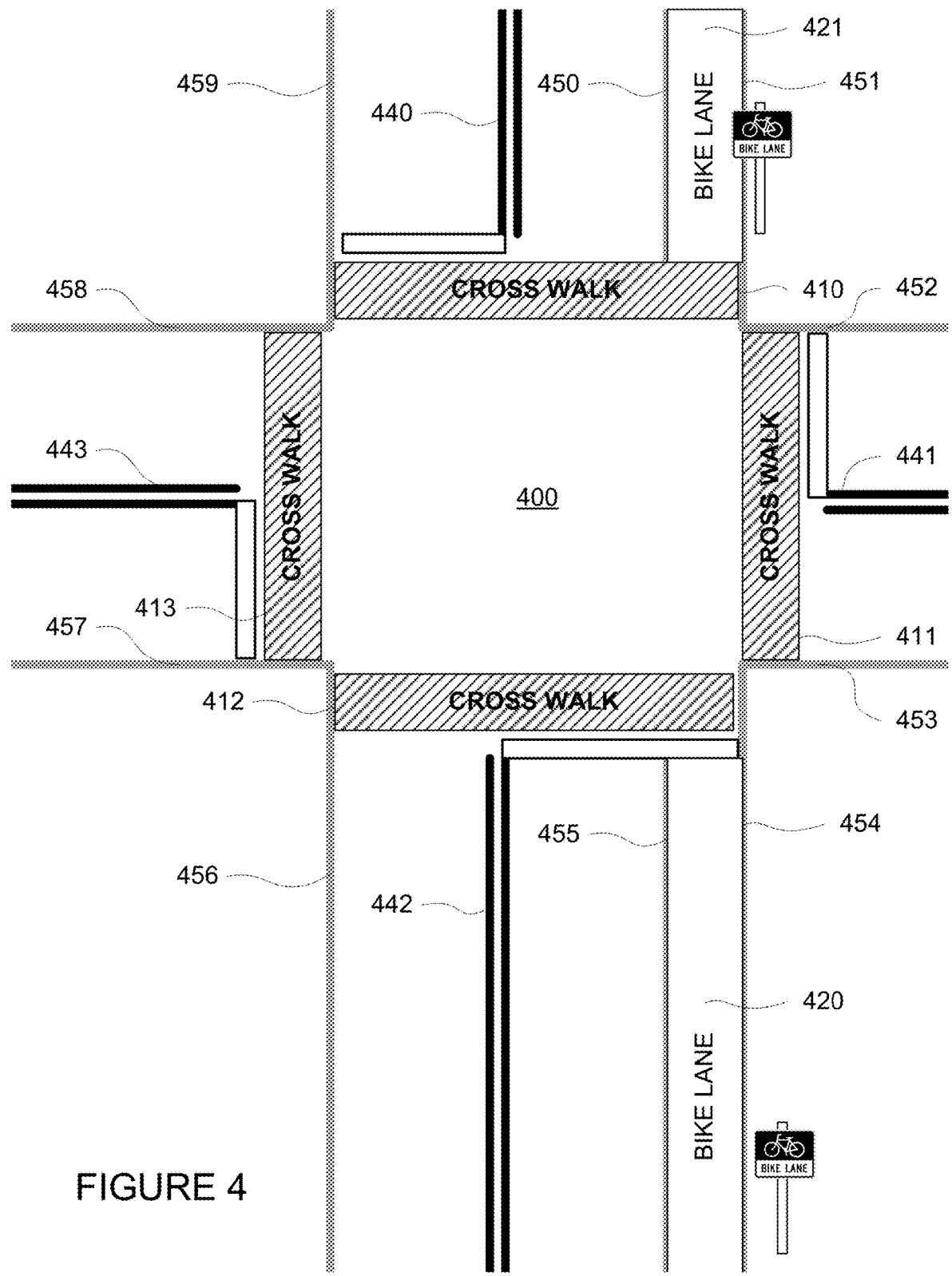
FIG. 4 is a roadgraph in accordance with an exemplary embodiment.

Data about the intersection (or other portions of the roadway) may be collected, for example, by driving a vehicle equipped with various object detection components. The data may be processed in order to generate roadgraph information describing the roadway. For example, as shown in FIG. 4, based on laser, geographic location, and other information collected while driving a vehicle through intersection 300, a roadgraph 400 of the intersection may be generated. Similar to intersection 300, roadgraph 400 may include various features such as lanes 430-437, and lane lines 440-443 and 450-459. Each of these features may be associated with geographic location information identifying where these objects may be located in the real world (for example in intersection 300). Again, although roadgraph 400 is depicted as an image-based map, it will be understood that this information may be stored as a grid of data or other information describing the various features and their relationships.

A roadgraph may also include annotations or other indicators identifying or classifying particular areas of the roadgraph. For example, the roadgraph may include tags, flags or other identifiers for areas of the roadway which are known to be generally occupied by persons not in another vehicle, such as pedestrians or bicyclists. Returning to FIG. 4, the roadgraph may include, for example, crosswalk identifiers 410-413 and bicycle lane identifiers 420-421. These identifiers may define the geographic boundaries of these areas in the roadgraph. As will be described in more detail below, this information may be downloaded to or transmitted to an autonomous vehicle's computer and stored in memory to be used to identify and react, if necessary, to various objects.

A roadgraph may also include one or more levels that correspond with different regions in space. For example, a roadgraph may contain both a level that includes a highway that travels under an overpass and another level that includes the overpass but not the underpass. As such, a region at a particular latitude and longitude may be graphically represented on multiple levels. In another example, one level may include the northbound direction of a divided highway while another level includes the southbound direction of the divided highway.

A roadgraph may further include one or more "warp zones" that represent a transition between two levels. A warp zone may be a region in space that may include both a source level and a destination level. Furthermore, the region in space encompassed by a warp zone may include an area that contains one or both of a region associated with a source level and a region associated with a destination level. A warp zone may be identified in several ways including, for example, as a set of latitude-longitude pairs that represent the vertices of a polygon or as a latitude-longitude pair and a radius that represent the center point and radius of a circle.

In addition to the operations described above and illustrated in the figures, various operations will now be described. It should be understood that the operations discussed herein do not have to be performed in the precise order described below. Rather, various steps can be handled in a different order or simultaneously, and steps may also be added or omitted.

Figure 5:
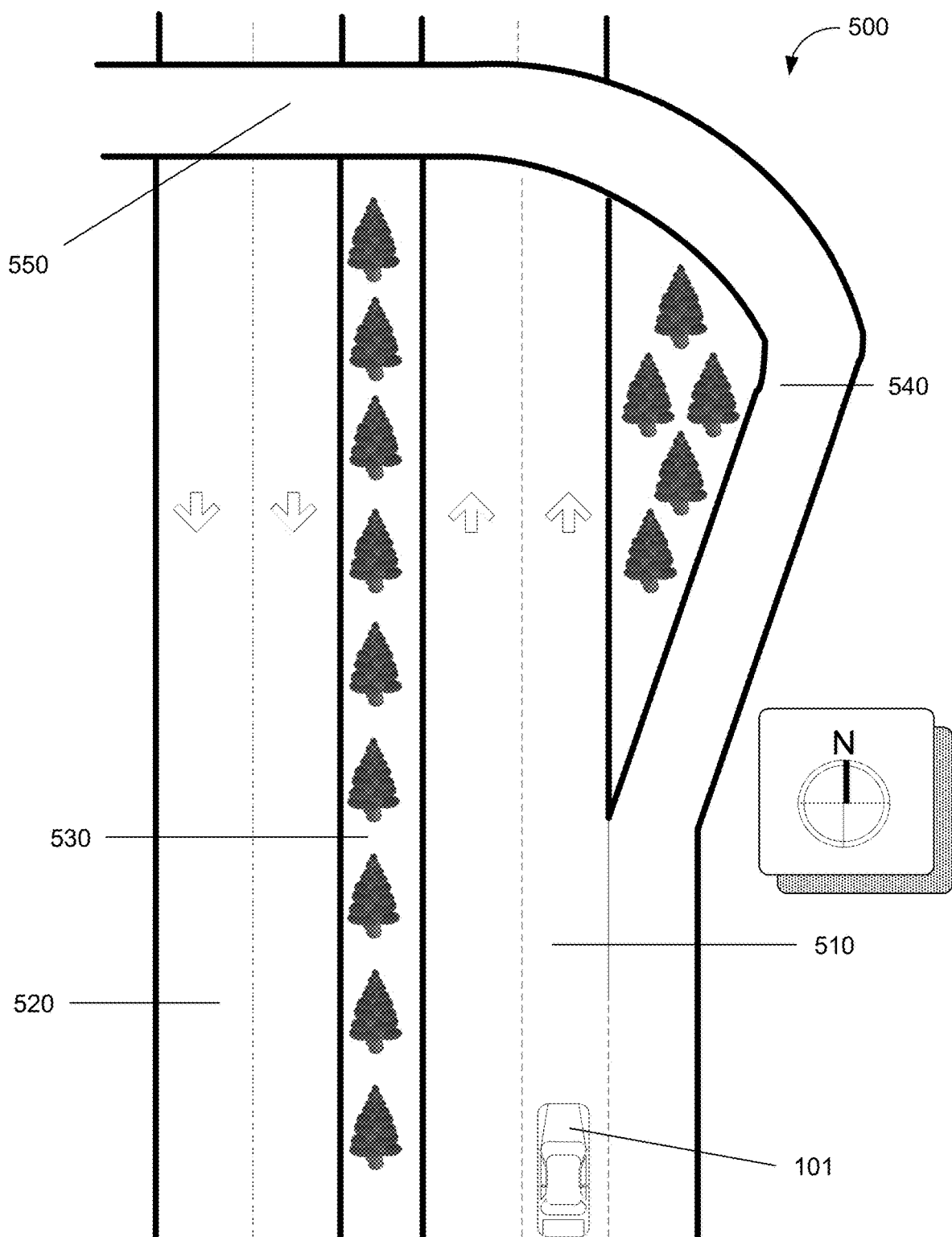
FIG. 5 is a birds-eye view of a highway in accordance with an exemplary embodiment.

FIG. 5 is an exemplary diagram of a map 500 that includes roadgraph data. Included in this map 500 is a highway with two northbound lanes 510, two southbound lanes 520, a highway divider 530 that separates the northbound lanes from the southbound lanes, an exit ramp 540, and an overpass 550. Furthermore, autonomous vehicle 101 is depicted as travelling in a northbound lane 510.

Figure 6:
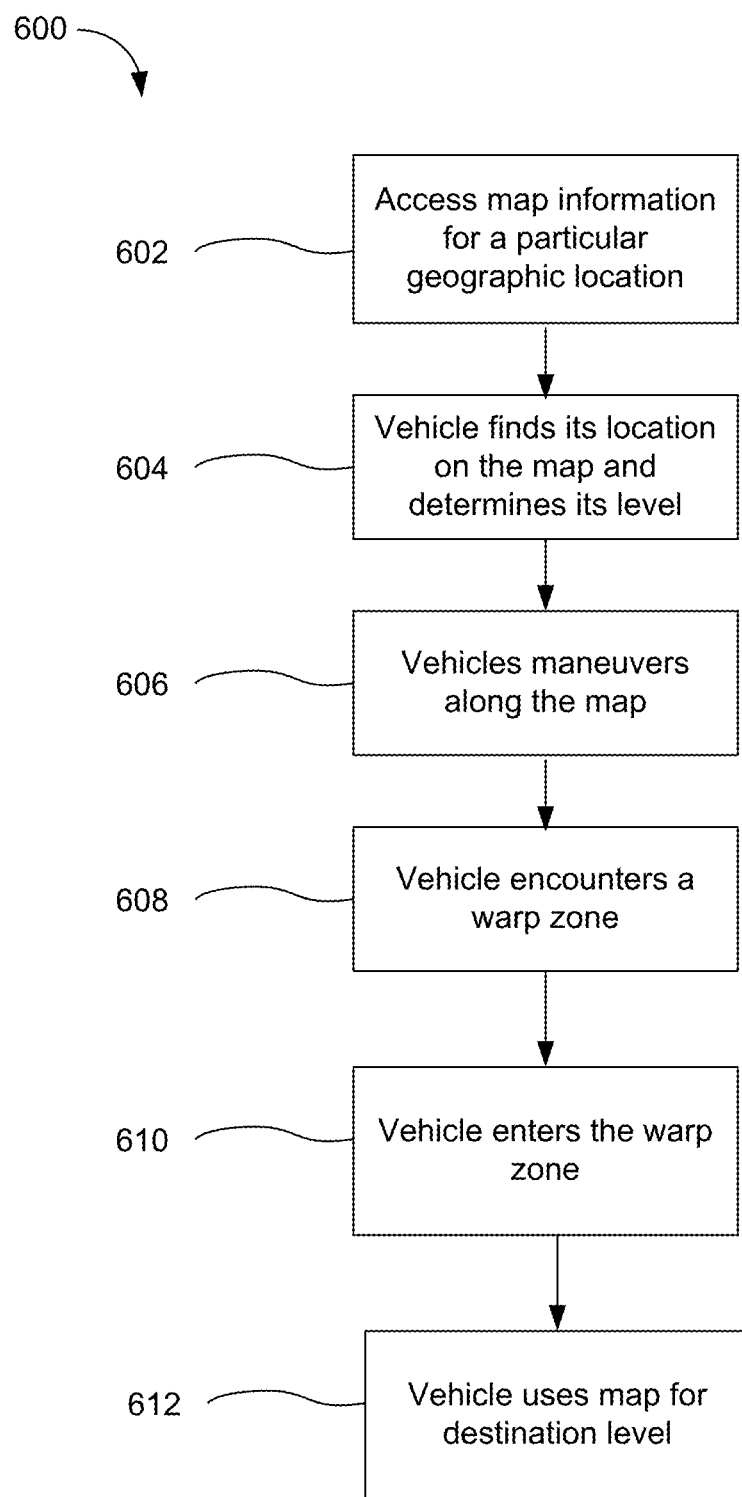
FIG. 6 is a flow diagram in accordance with an exemplary embodiment.

FIG. 6 is an exemplary flow diagram depicting aspects of a process 600 for switching from one map level to another. At block 602, autonomous vehicle 101 may access a map 500 as described above. The map 500 may be accessed based on the current geographic location of the vehicle 101. For example, a map 500 may be accessed based on the latitude and longitude of the vehicle 101. As described above, this map may reside in a memory in a vehicle 101 or may be accessed from a memory at another location. Furthermore, the map may include roadgraph or other information relevant for the vehicle 101 to understand its location and surroundings.

At block 604, a vehicle 101 (using system 110) may determine where on the map it is currently located. Furthermore, the vehicle 101 may determine on which level it is located using a variety of factors. In one embodiment, the vehicle 101 may determine its level based on factors such as the direction that the vehicle is pointed, the density of the map at the vehicle's location, the agreement between the vehicle's sensors and any pre-defined maps, or a combination of these and other factors. Using FIG. 5 as an example, a map 500 may be divided into two or more levels. For instance, one level may consist of northbound lanes 510, highway divider 530, and exit ramp 540 (herein referred to as Level 1); another level may consist of southbound lanes 520 and highway divider 530 (herein referred to as Level 2); and a third level may consist of exit ramp 540 and overpass 550 (herein referred to as Level 3). The vehicle in this example, located on a northbound lane 510 and pointed North, may determine that it is on Level 1.

Figure 7:
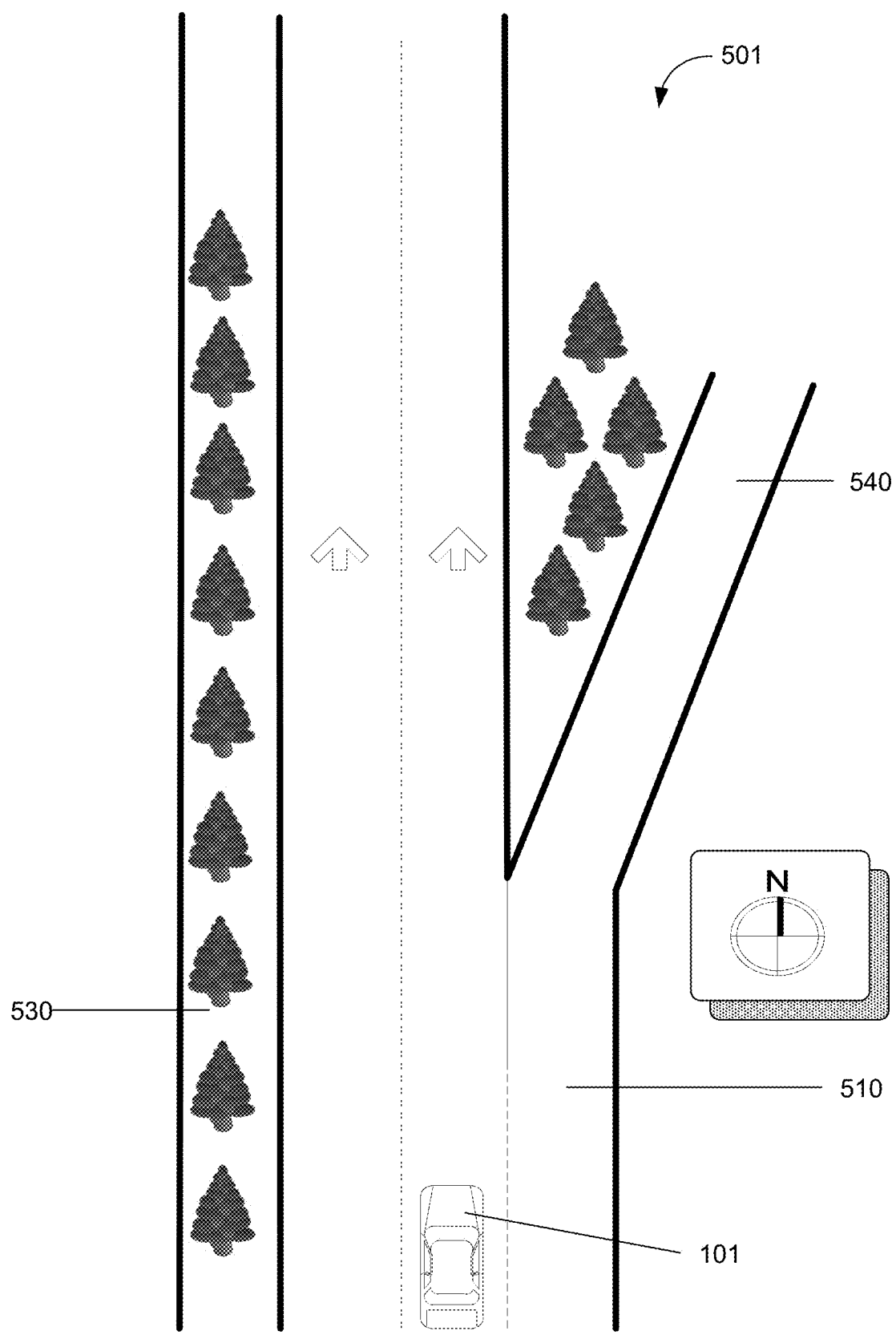
FIG. 7 is a birds-eye view of a highway in accordance with an exemplary embodiment.
Figure 8:
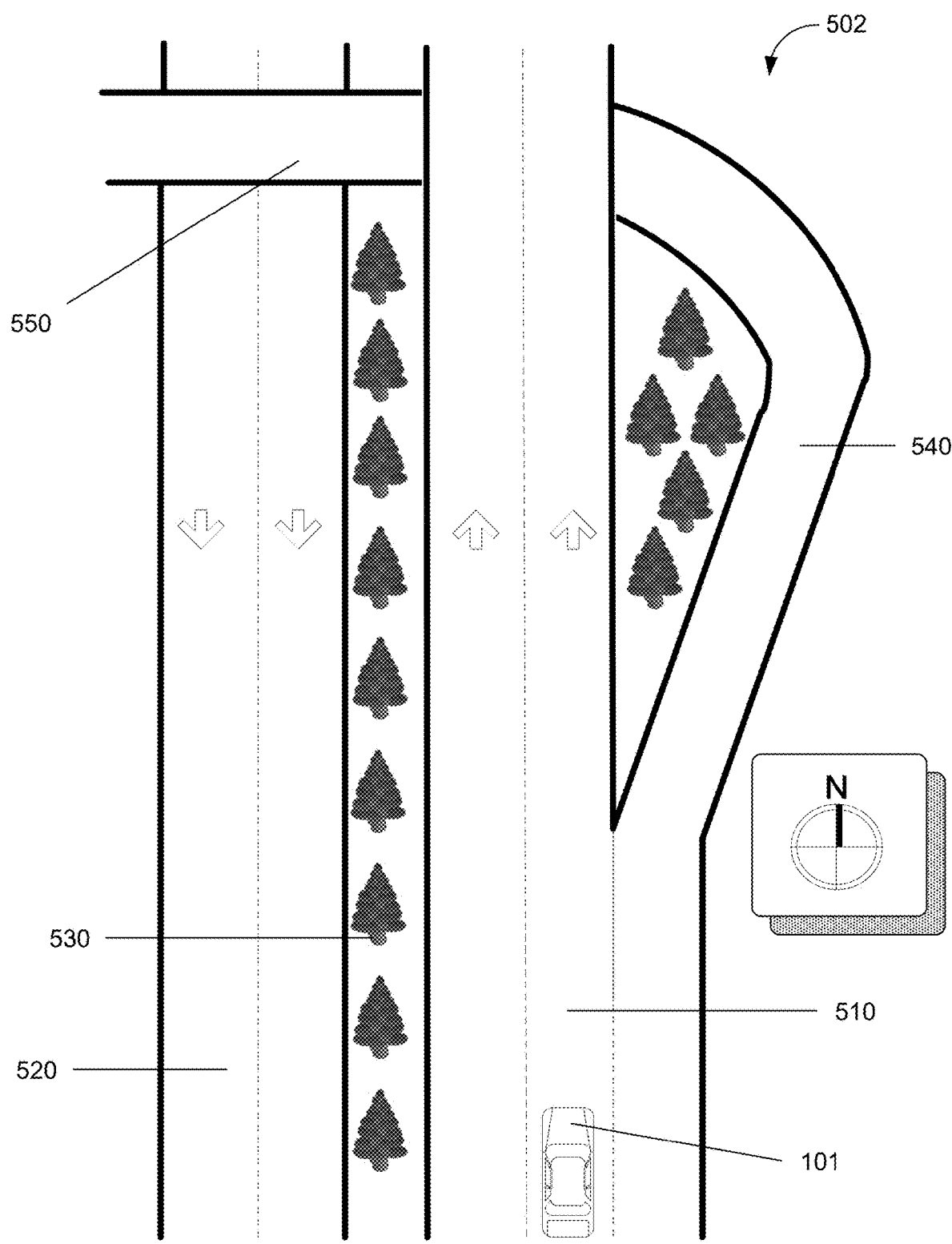
FIG. 8 is a birds-eye view of a highway in accordance with an exemplary embodiment.

At block 606, the vehicle may maneuver using the part of the map corresponding to the level determined in block 604. For example, if vehicle 101 is on Level 1 of map 500, the vehicle 101 may use a map that excludes Levels 2 and 3. As a result, vehicle 101 may use portions of a map 500 that includes the underpass for the northbound lanes 510 and excludes the overpass 550. FIG. 7 is an example of a map 501 that may be used by a vehicle 101 that is on Level 1 according to one embodiment. Alternatively, a vehicle that is on a particular level may use a map including that level and a combination of one or more surrounding levels. For portions of a map in which the current level overlaps another level, the current level may be used for the overlapping portion. For example, vehicle 101 on Level 1 of map 500 may use each of Levels 1, 2, and 3 but, for portions where levels overlap, may use only the portions of Level 1. FIG. 8 is an example of a map 502 that may be used by a vehicle 101 that is on Level 1 according to another embodiment. As shown in FIG. 8, the map 502 includes each of Levels 1, 2, and 3 that may be used by vehicle 101. Only Level 1 is used, however, for the portion of the map 502 in which Levels 1 and 2 overlap.

Figure 9:
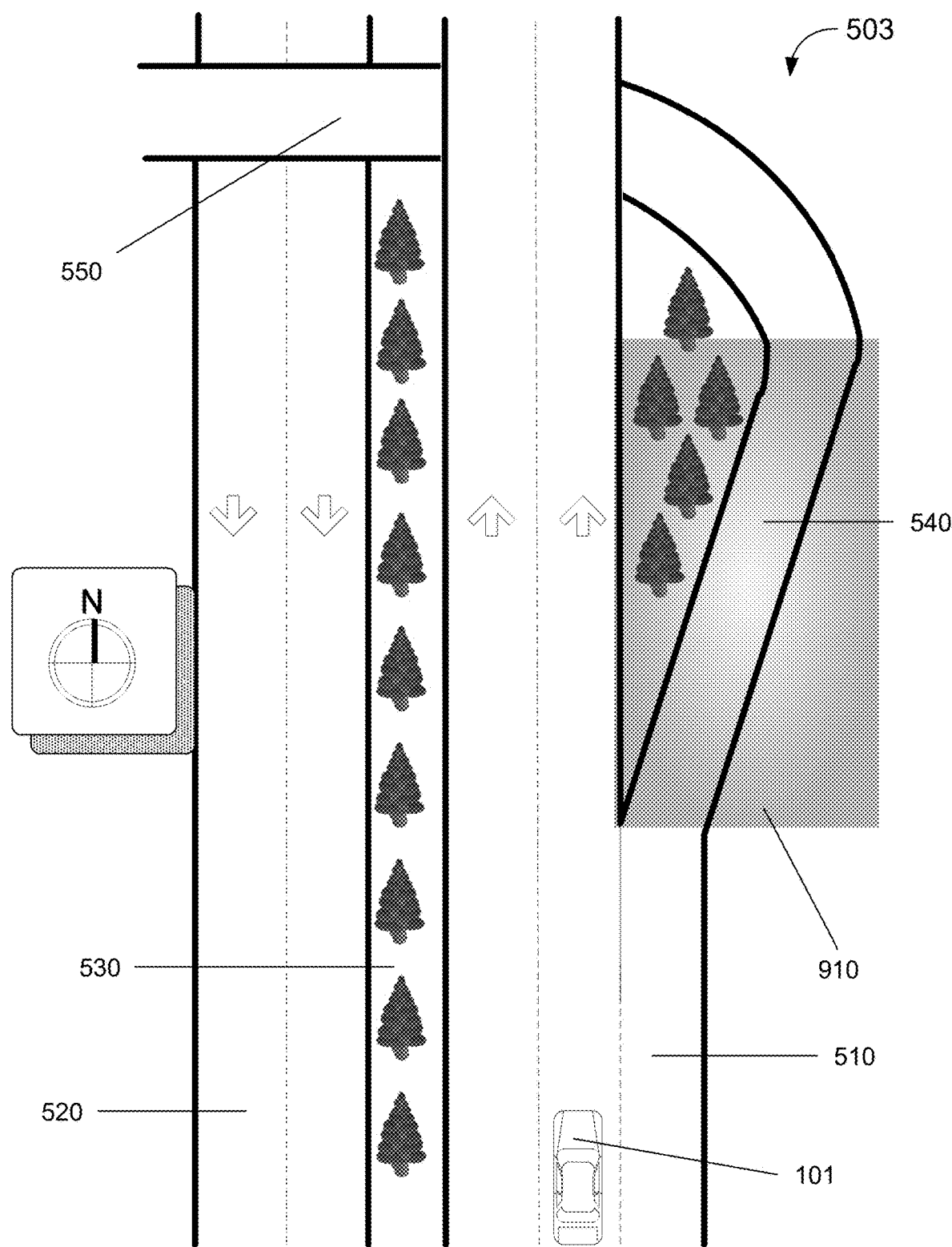
FIG. 9 is a birds-eye view of a highway in accordance with an exemplary embodiment.

At block 608 of FIG. 6, a vehicle 101 maneuvers along a map and may encounter a warp zone when transitioning from one level to another. As described above, a warp zone may represent a portion in space that overlaps one or more levels. A vehicle may be considered to have come into a warp zone when it has either partially or completely entered or exited the warp zone's area. FIG. 9 is an example of a map 503 that contains a warp zone 910, indicated by the shaded region. In this example, the warp zone is positioned in an area in which vehicle 101 would exit northbound lanes 510 and enter the exit ramp 540. As a result, vehicle 101 would enter the warp zone 910 when it moves into the area encompassed by the warp zone 910.

Figure 10:
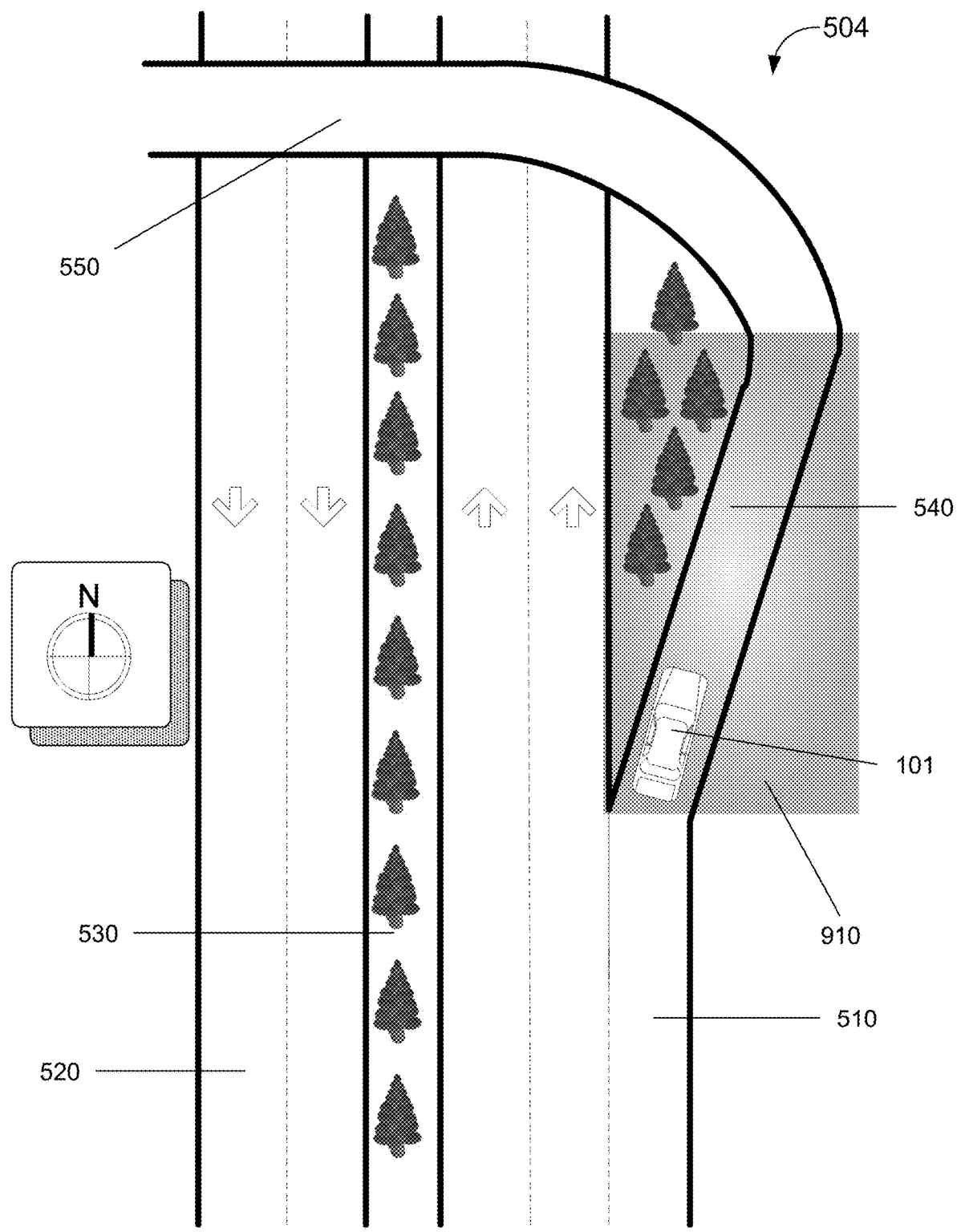
FIG. 10 is a birds-eye view of a highway in accordance with an exemplary embodiment.

In this instance, at block 610 of FIG. 6, vehicle 101 enters the area encompassed by warp zone 910. At block 612, vehicle 101 uses the map corresponding with the destination level associated with the warp zone. FIG. 10 is an example of a map 504 of where vehicle 101 encounters the warp zone 910 and uses the corresponding map. In this example, the source level associated with the warp zone 910 is Level 1 (including northbound lanes 510) and the destination level associated with the warp zone 910 is Level 2 (including the overpass 550). When vehicle 101 enters the area encompassed by the warp zone 910, the corresponding map 504 for the destination level is used. As such, any portions of the map associated with the destination level that were hidden by portions of the source level are viewable when the vehicle enters the warp zone. For example, as shown in FIG. 10, the portion of the overpass 550 that was hidden below northbound lanes 510 while vehicle 101 was on Level 1 is used when the vehicle 101 enters warp zone 910.

Figure 11:
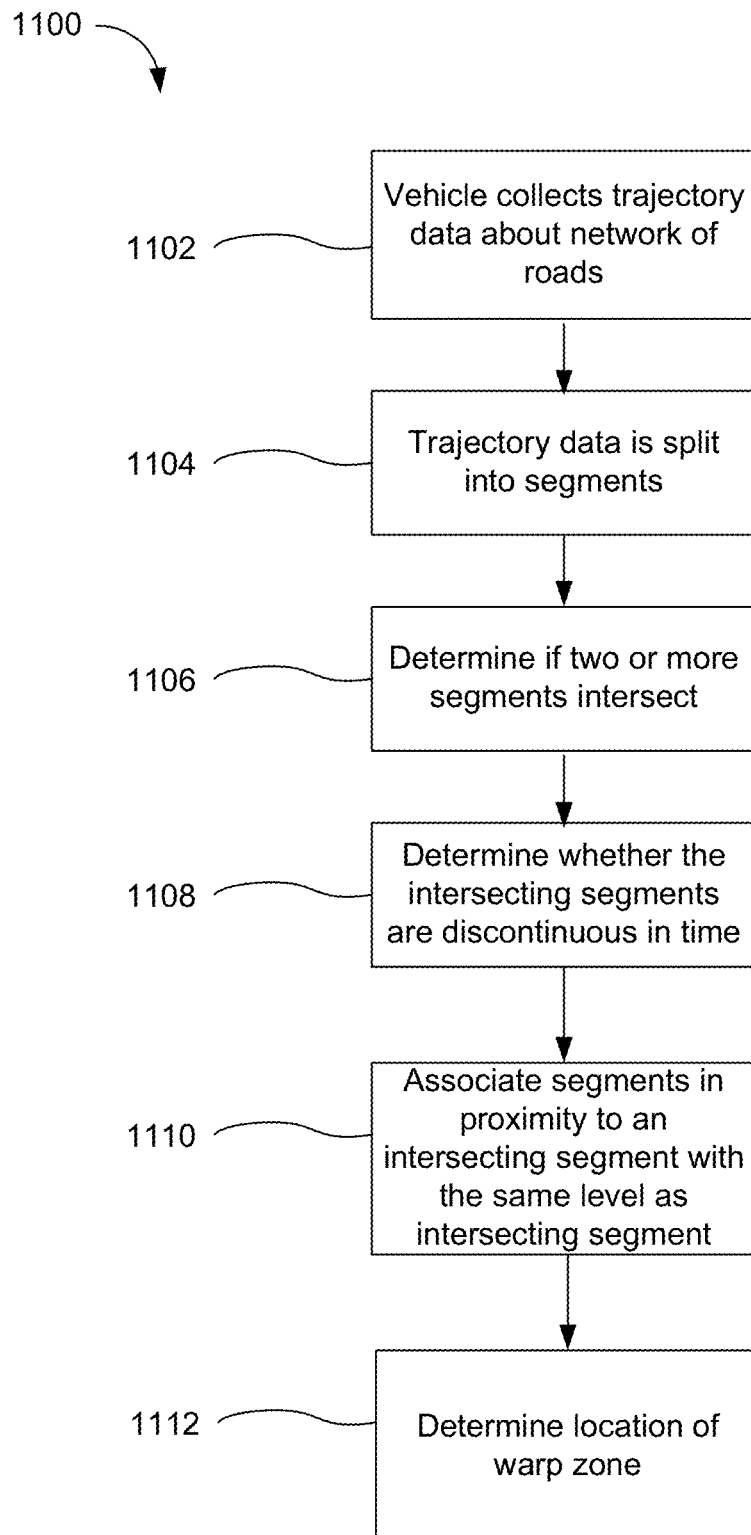
FIG. 11 is a flow diagram in accordance with an exemplary embodiment.
Figure 12:
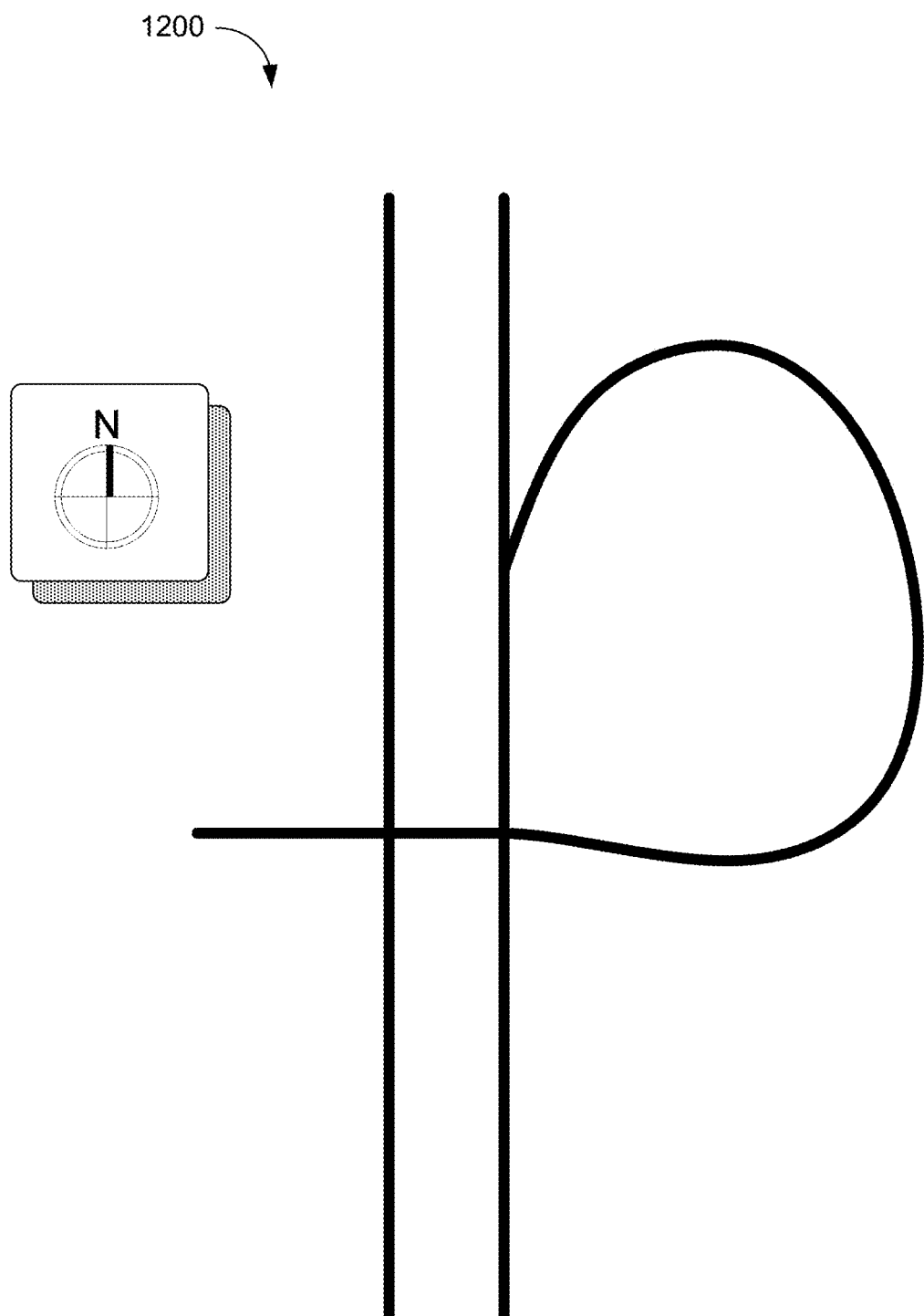
FIG. 12 is a birds-eye view of a highway in accordance with an exemplary embodiment.
Figure 13:
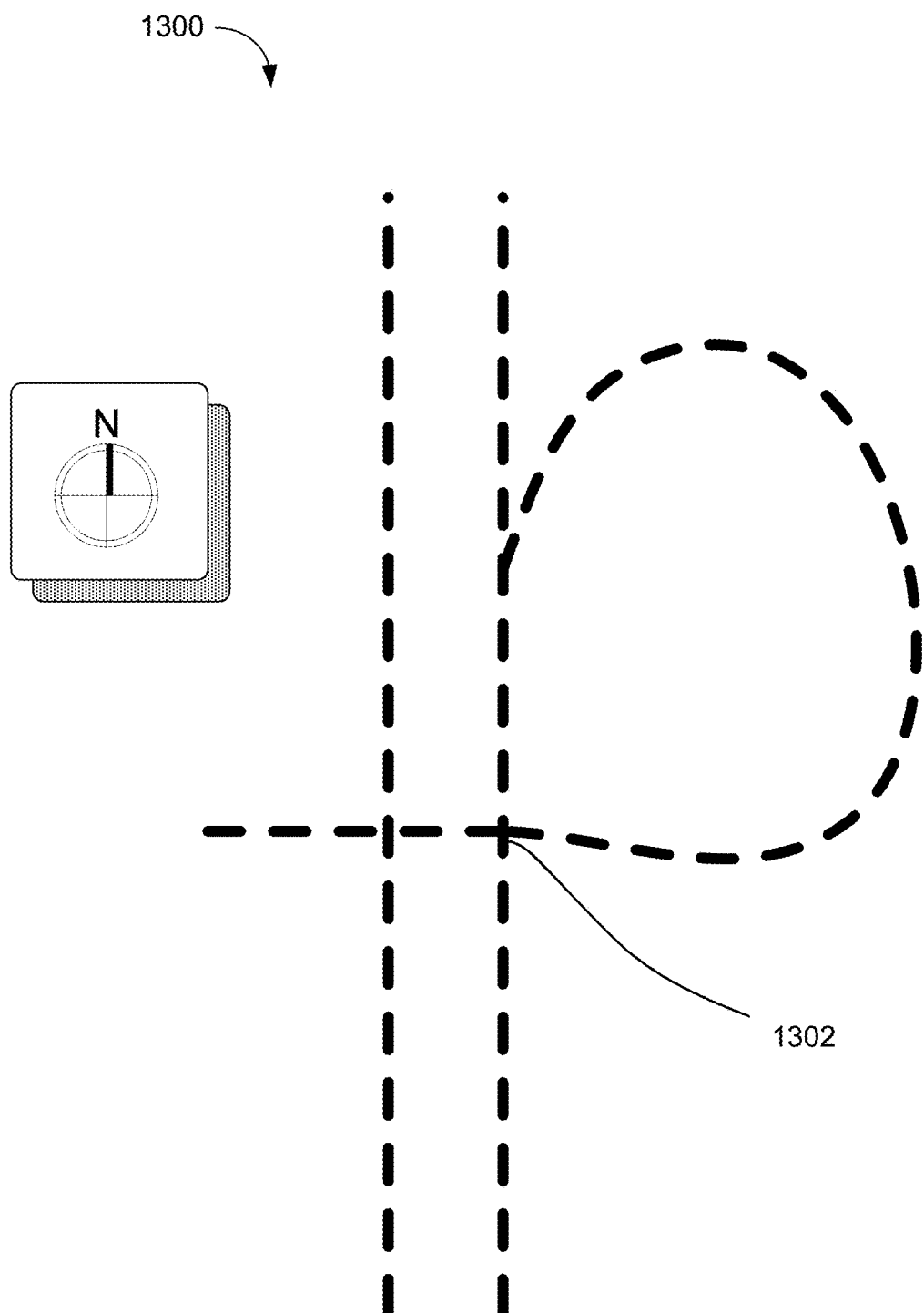
FIG. 13 is a birds-eye view of a highway in accordance with an exemplary embodiment.

FIG. 11 is an exemplary flow diagram 1100 for generating one or more levels and warp zones. At block 1102, an autonomous vehicle may collect data related to its trajectory. For example, an autonomous vehicle may continuously collect data related to its location based on its latitude and longitude as the vehicle traverses a network of roads. These trajectories may appear as a continuous path that corresponds with a map that matches a network of highways, service roads, etc, such as, for example, map 1200 of FIG. 12. At block 1104 of FIG. 11, the trajectory data collected by the autonomous vehicle may be divided into segments. Each segment may correspond to a unit of distance, time, or any other unit of measure. For example, a trajectory may be divided into segments that may represent the location of a vehicle at intervals of 0.1 seconds. FIG. 13 is an example of trajectory data from map 1200 that has been split into segments.

Returning to FIG. 11, at block 1106 the segments may be examined to find whether two or more segments may be intersecting. For example, map 1300 contains two segments that intersect at point 1302 where a highway passes below an overpass. At block 1108, the intersecting segments may be examined to determine whether they are discontinuous in time. An autonomous vehicle that travels from the highway, onto an exit ramp, and on the overpass may pass the two intersecting segments at different times. Because the two segments intersect in space but are discontinuous in time, the segments may represent two different levels.

At block 1110, each intersecting segment may be associated with a level. Furthermore, each intersecting segment may be associated with neighboring segments. These neighboring segments may further be associated with the same level associated with the corresponding intersecting segment. A non-intersecting segment may be considered to be neighboring an intersecting segment based on a number of factors, such as, for example, its spatial or temporal distance to an intersecting segment. Segments may be assigned to a level automatically or manually, such as, for example, via a GUI.

Figure 14:
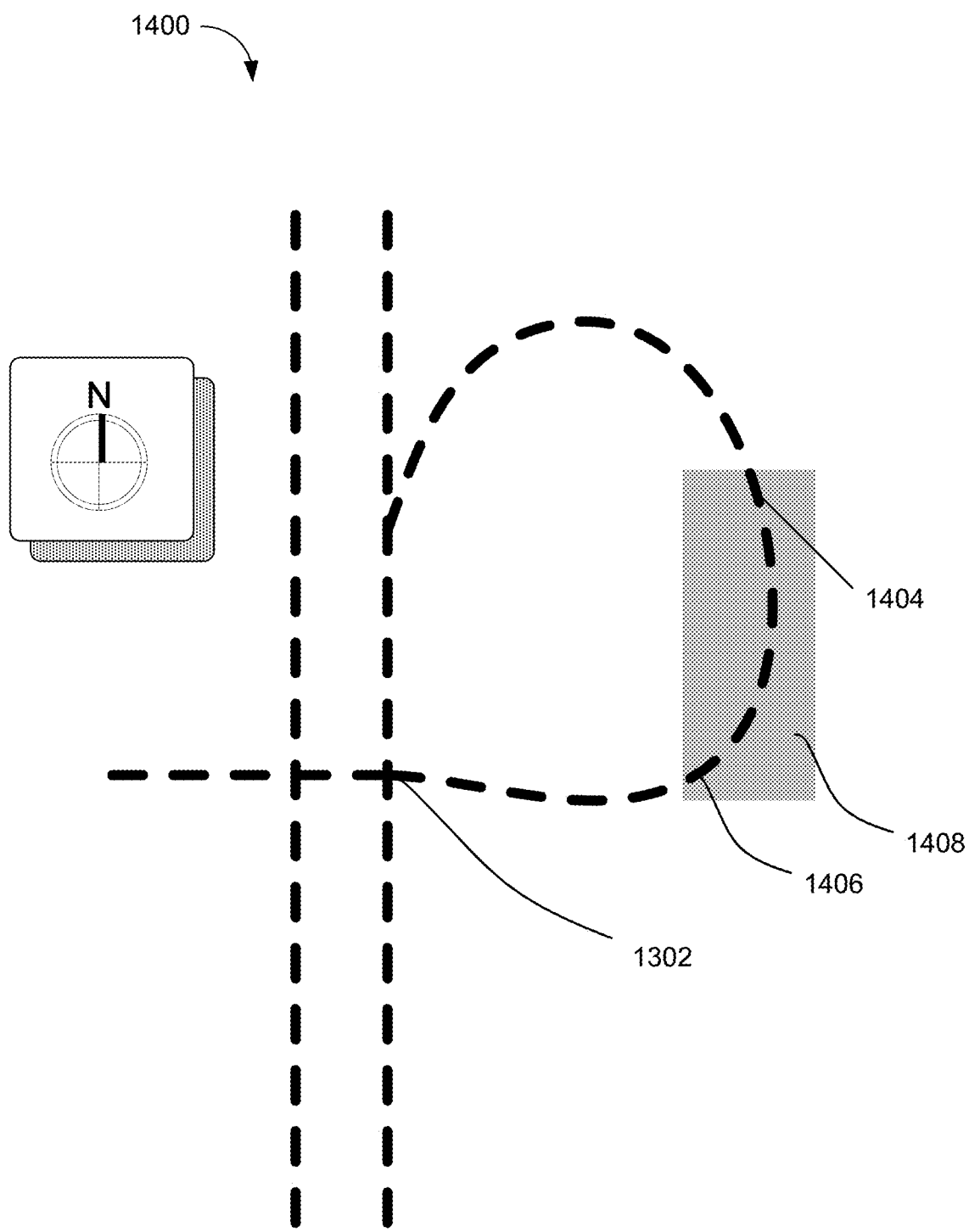
FIG. 14 is a birds-eye view of a highway in accordance with an exemplary embodiment.

At block 1112, the segments may be examined to determine the location of a warp zone between the levels associated with intersecting segments. In one embodiment, the location of a warp zone may be determined by using a predetermined distance from an intersecting segment. For example, as shown in FIG. 14, a warp zone 1408 may begin 10 segments (1404) before an intersecting segment 1302 and end 5 segments (1406) before the intersecting segment. In another embodiment, the location of a warp zone may be determined by using a distance associated with one or more sensors. For example, if an autonomous vehicle includes a laser that can sense objects up to 10 feet away, a warp zone may begin or end 10 feet from an intersecting segment.

As these and other variations and combinations of the features discussed above can be utilized without departing from the subject matter defined by the claims, the foregoing description of exemplary embodiments should be taken by way of illustration rather than by way of limitation of the claimed subject matter. It will also be understood that the provision of examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for controlling a vehicle, the method comprising:
   determining, using a global positioning component, a first location of the vehicle, the first location of the vehicle being within a first map region;
   responsive to determining the first location of the vehicle:
      retrieving, from a memory, first roadgraph data and second roadgraph data, the first roadgraph data corresponding to the first map region, the second roadgraph data corresponding to a second map region, the second map region including a portion of the first map region and a portion of a third map region, and the second roadgraph data including one or more identifiers corresponding to areas of a roadway designated for road users not in another vehicle; and
      configuring a map to include at least the first roadgraph data and the second roadgraph data;
   maneuvering, using one or more processors, the vehicle from the first location to a second location using the map and the one or more identifiers, the second location being within the second map region;
   responsive to the vehicle reaching the second location:
      retrieving, from the memory, third roadgraph data, the third roadgraph data corresponding to the third map region; and
      configuring an updated map to include at least the second roadgraph data and the third roadgraph data; and
   maneuvering, using the one or more processors, the vehicle from the second location to a third location using the updated map and the one or more identifiers, the third location being within the third map region.

2. The method of claim 1, wherein the map does not include the third roadgraph data.

3. The method of claim 1, wherein the updated map does not include the first roadgraph data.

4. The method of claim 1, wherein the second roadgraph data includes data identifying one or more other vehicles, and
   wherein maneuvering, using one or more processors, the vehicle from the first location to the second location using the map and the one or more identifiers is further based on the data identifying one or more other vehicles.

5. The method of claim 1, wherein the second roadgraph data includes data identifying one or more lane lines, and
   wherein maneuvering, using one or more processors, the vehicle from the first location to the second location using the map and the one or more identifiers is further based on the data identifying one or more lane lines.

6. The method of claim 1, wherein the second roadgraph data includes data identifying one or more traffic directions corresponding to one or more lanes, and
   wherein maneuvering, using one or more processors, the vehicle from the first location to the second location using the map and the one or more identifiers is further based on the data identifying one or more traffic directions corresponding to one or more lanes.

7. The method of claim 1, wherein the second roadgraph data includes data identifying one or more crosswalks or bicycle lanes, and
   wherein maneuvering, using one or more processors, the vehicle from the first location to the second location using the map and the one or more identifiers is further based on the data identifying one or more crosswalks or bicycle lanes.

8. The method of claim 1, wherein the second roadgraph data includes data identifying one or more buildings, and
   wherein maneuvering, using one or more processors, the vehicle from the first location to the second location using the map and the one or more identifiers is further based on the data identifying one or more buildings.

9. The method of claim 1, wherein the second roadgraph data includes data identifying one or more speed limits, traffic signs, or traffic signals, and
   wherein maneuvering, using one or more processors, the vehicle from the first location to the second location using the map and the one or more identifiers is further based on the data identifying one or more speed limits, traffic signs, or traffic signals.

10. The method of claim 1, wherein the second roadgraph data includes data identifying current traffic information, and
wherein maneuvering, using one or more processors, the vehicle from the first location to the second location using the map and the one or more identifiers is further based on the data identifying current traffic information.

11. The method of claim 1, wherein the first roadgraph data, the second roadgraph data, and the third roadgraph data each comprise a respective graph network of information including roads, lanes, and intersections.

12. The method of claim 11, wherein the respective graph network of information further includes a connection between at least two of the roads, the lanes, and the intersections.

13. The method of claim 11, wherein at least one of the roads, the lanes, and the intersections is stored in a cell or grid of the respective graph network of information and associated with a geographic location or another one of the roads, the lanes, and the intersections.

14. A system for controlling a vehicle in an autonomous driving mode, the system comprising one or more processors configured to:
determine a first location of the vehicle, the first location of the vehicle being within a first map region;
responsive to determining the first location of the vehicle:
retrieve, from a memory, first roadgraph data and second roadgraph data, the first roadgraph data corresponding to the first map region, the second roadgraph data corresponding to a second map region, the second map region including a portion of the first map region and a portion of a third map region, and the second roadgraph data including one or more identifiers corresponding to areas of a roadway of the second map region designated for road users not in another vehicle; and
configure a map to include at least the first roadgraph data and the second roadgraph data;
maneuver the vehicle from the first location to a second location using the map and the one or more identifiers, the second location being within the second map region;
responsive to the vehicle reaching the second location:
retrieve, from the memory, third roadgraph data, the third roadgraph data corresponding to the third map region; and
configure an updated map to include at least the second roadgraph data and the third roadgraph data; and
maneuver the vehicle from the second location to a third location using the updated map and the one or more identifiers, the third location being within the third map region.

15. The system of claim 14, wherein the map does not include the third roadgraph data.

16. The system of claim 14, wherein the updated map does not include the first roadgraph data.

17. The system of claim 14, wherein the second roadgraph data includes data identifying one or more other vehicles, and
wherein the one or more processors are further configured to maneuver the vehicle from the first location to the second location based on the data identifying one or more other vehicles.

18. The system of claim 14, wherein the second roadgraph data includes data identifying one or more lane lines, and
wherein the one or more processors are further configured to maneuver the vehicle from the first location to a second location based on the data identifying one or more lane lines.

19. The system of claim 14, wherein the second roadgraph data includes data identifying one or more traffic directions corresponding to one or more lanes, and
wherein the one or more processors are further configured to maneuver the vehicle from the first location to a second location based on the data identifying one or more traffic directions corresponding to one or more lanes.

20. The system of claim 14, wherein the second roadgraph data includes data identifying one or more crosswalks or bicycle lanes, and
wherein the one or more processors are further configured to maneuver the vehicle from the first location to a second location based on the data identifying one or more crosswalks or bicycle lanes.

21. The system of claim 14, wherein the second roadgraph data includes data identifying one or more buildings, and
wherein the one or more processors are further configured to maneuver the vehicle from the first location to a second location based on the data identifying one or more buildings.

22. The system of claim 14, wherein the second roadgraph data includes data identifying one or more speed limits, traffic signs, or traffic signals, and
wherein the one or more processors are further configured to maneuver the vehicle from the first location to a second location based on the data identifying current traffic information, or one or more speed limits, traffic signs, or traffic signals.

23. The system of claim 14, wherein the vehicle comprises the system for controlling the vehicle.

* * * * *

UNITED STATES PATENT AND TRADEMARK OFFICE
CERTIFICATE OF CORRECTION

| | |
|---|---|
| PATENT NO. | : 11,852,492 B1 |
| APPLICATION NO. | : 17/075867 |
| DATED | : December 26, 2023 |
| INVENTOR(S) | : Christopher Paul Urmson et al. |

It is certified that error appears in the above-identified patent and that said Letters Patent is hereby corrected as shown below:

In the Claims

Claim 22, Column 12, Lines 46, 47 and 48:
Now reads: "a second location based on the data identifying current traffic information,"; should read -
- a second location based on data identifying current traffic information, --

Signed and Sealed this
Fifth Day of March, 2024

Katherine Kelly Vidal
*Director of the United States Patent and Trademark Office*